July 30, 1940.  R. L. DAVISON  2,209,324
DUCT HEATING SYSTEM
Filed Aug. 2, 1935  2 Sheets-Sheet 2
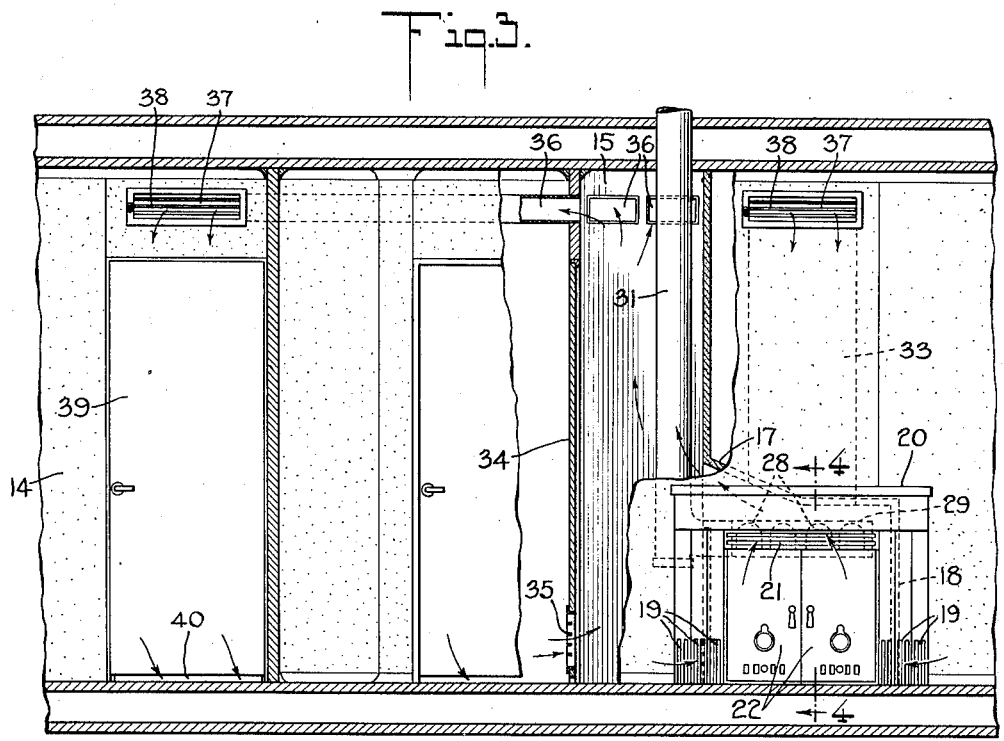
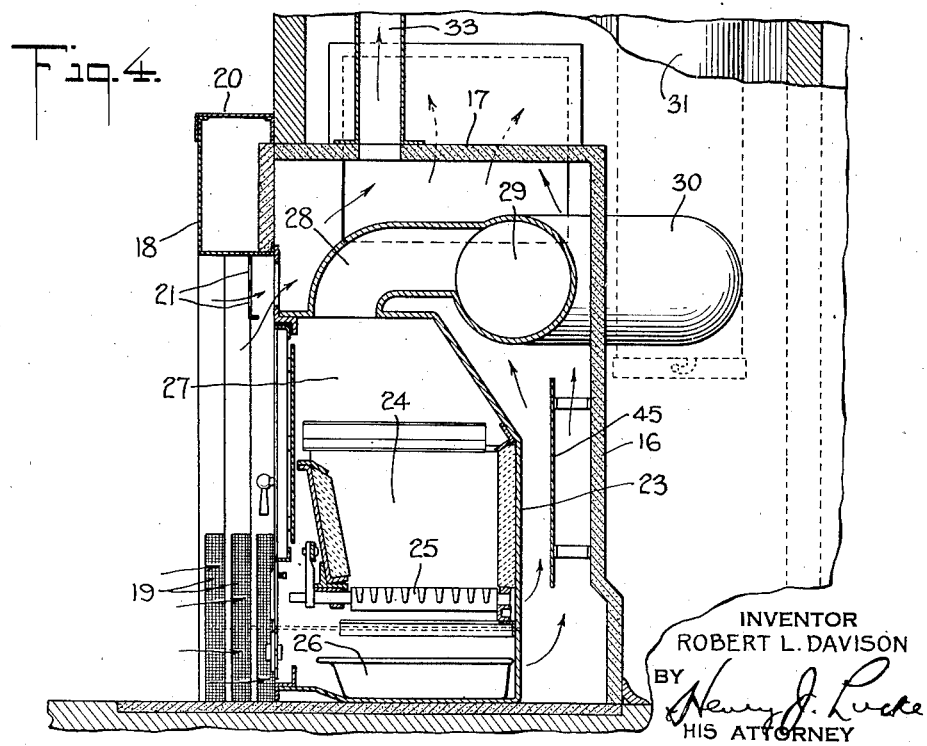
INVENTOR
ROBERT L. DAVISON
BY
HIS ATTORNEY Patented July 30, 1940

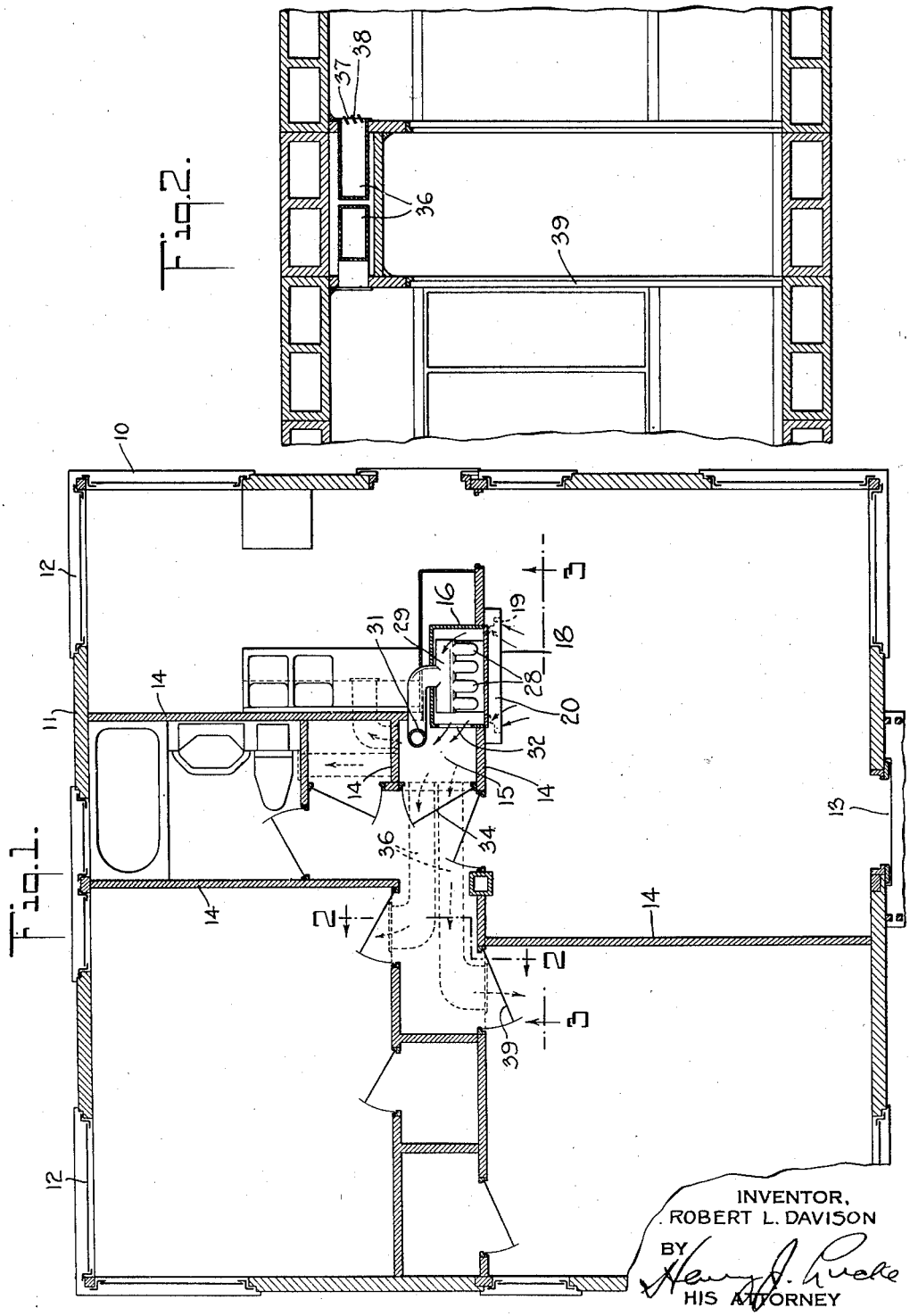

2,209,324

UNITED STATES PATENT OFFICE 2,209,324

DUCT HEATING SYSTEM

Robert L. Davison, New York, N. Y., assignor to John B. Pierce Foundation, New York, N. Y., a corporation of New York Application August 2, 1935, Serial No. 34,353

2 Claims. (Cl. 237—55)

This invention relates to heating systems and more particularly to heating systems of the duct type wherein ducts i. e. conduits are utilized to convey heated air from a central thermal unit to locations remote from such thermal unit.

Embodiments of the present invention comprise a heating unit preferably readily convertible from open hearth type to furnace type and vice versa at the option of the user, the heating unit per se being disposed within a suitable enclosure for operating efficiently as a component unit of the duct system in supplying heated air therefor whether such heating unit is in its open hearth or furnace status. Advantageously, heated air is discharged from contact with the heating unit directly into a chamber, preferably for mixing with additional air at a reduced temperature and for distribution through a plurality of variantly directed ducts i. e. conduits, return of such air to the heating unit in its spent, cooled condition for continued circulation through the system being accomplished positively, but without the use of confining ducts or conduits.

The present system is particularly well adapted to the heating of so called pre-fabricated houses constructed usually without basement, and affording a minimum amount of space for the placing of a heating system and its component units.

Pursuant to such application, the heating unit per se is positioned within desirably, a heat insulated enclosure, the enclosure being disposed proximate a room of the house, and adjacent to and communicating with a chamber functioning to temper excessively hot air flowing thereto from the stated enclosure and to distribute such tempered air to a plurality of ducts i. e. conduits communicating at one end with the chamber, the ducts individually communicating at their other ends with respective rooms to be heated. Return of the spent, cold air from respective rooms of the house to complete circulation through the system, is accomplished by affording unconfined passage of such air to the location of the heating assembly, a portion of such air preferably passing directly into the distribution chamber through suitably provided openings and the remainder passing indirectly thereinto by way of the heating unit and surrounding enclosure. The heating unit per se is so positioned within the enclosure as to be readily convertible from open hearth to furnace status and vice versa.

Preferably the heating unit of the present system embodies the principles of the open-hearth hot air heater forming the subject of U. S. Patent 2,028,088, issued January 14, 1936, to Robert L. Davison and Edgar V. Ludwig.

In the accompanying drawings illustrating a preferred embodiment of the present invention, Fig. 1 represents a horizontal section taken through one story of a house in which my heating system is installed, the floor plan of same being illustrated.

Fig. 2 represents a vertical section taken on line 2—2, Fig. 1.

Fig. 3 represents a vertical section taken on line 3—3, Fig. 1.

Fig. 4 represents a vertical section taken on line 4—4, Fig. 3.

Referring to the drawings, 10 designates a building structure having the usual enclosing walls 11, windows 12 and door 13, the area within the walls, windows and door being sub-divided into a plurality of rooms and enclosures by the partitions 14. One of such enclosures is designated by the reference numeral 15 and constitutes a chamber of the nature of a stack which is here utilized in connection with and as a part of my improved heating system.

A heating unit is adapted to be placed behind one of the partitions 14 or housed between spaced partitions 14, or may be included in an area defined by three or more of the partitions 14. Because, however, of the ornamental character of the open hearth feature of my improved heating unit, I preferably arrange the outlet portion thereof, or that portion having access to the fire box in the face of one of the partitions 14 and opening into a room, as clearly illustrated in Figs. 1 and 4.

The heating unit is disposed within an enclosure 16, preferably of heat insulating material, advantageously rectangular in form, and consisting of four upright walls and a cover or top plate 17 as clearly shown in Figs. 1 and 4. The enclosure 16 communicates with, and in the present case is practically an extension of the chamber 15, as clearly shown in Fig. 3. The front wall of the enclosure 16, projects, through the partition 14, and comprehends only the upper portion of the frontal area of the enclosure 16, a hollow, perforated ornamental front casing 18 extending around the lateral sides and top of the front wall to define the afore referred to outlet portion of the heating unit. As shown in elevation in Fig. 4, and in plan in Fig. 1, the casing 18 has a front formed in a series of steps, as indicated by the arrows in Fig. 1, and such steps are provided with perforations, as indicated by the reference numeral 19, and as indicated by the arrows in Figs. 3 and 4. The top surface of the casing 18 constitutes a mantle 20, and below the mantle and within the casing is provided a plurality of perforations as indicated by the numeral 21 in Figs. 3 and 4. The hollow casing 18 communicates with the interior of the enclosure 16 and the arrows, for example, in Fig. 4 indicate the paths of air as it flows through the perforations 19 and 21 and through said enclosure 16.

Formed on the hollow casing 18 are suitable hinges on which are hinged doors 22 as shown in Fig. 3, constituting means by which access to the interior of the heating unit may be obtained.

The heating unit preferably comprises a casing 23 comprehending a fire box 24, a grate 25, an ash pit 26, and a smoke chamber 27. A plurality of pipes 28, in the present case four are illustrated, but the number may be varied as desired, lead from the top of casing 23 and communicate with a header 29, from which extends outwardly through the rear wall of the enclosure 16, an exhaust pipe 30. Such exhaust pipe 30, as stated above, extends outwardly from the enclosure 16, thence parallel thereto, passing through one of the partitions 14 into the chamber 15 and is connected to a flue pipe 31 leading to a chimney or other vent (not shown.)

The enclosure 16 may communicate with the chamber 15 adjacent its top by a passage 32. Leading upwardly from the interior of the enclosure 16 may be a duct 33 through which heated air is carried to the upper part of the room in which the heating unit is located.

The chamber 15 is provided with a door 34 by means of which access to the chamber may be had. In said door adjacent the bottom thereof is a grille 35 through which relatively cold air may flow inwardly and upwardly as shown by arrows in Fig. 3.

Leading from the top of the chamber 15 is a plurality of ducts 36, such ducts leading to the various rooms of the structure 10. The ducts 36 communicate respectively with the various rooms, and preferably at locations adjacent the ceilings thereof as shown in Fig. 3.

Each of the ducts 36 may be provided at its discharge end with a grille 37 provided with pivotally mounted shutter plates 38 by means of which the effective opening of the ducts may be controlled.

The heated air flows from the chamber 15 through the ducts 36, through grilles 37 and into the various rooms as indicated by the arrows in Figs. 1 and 3. By reason of circulation through the system, the course of such heated air will be generally downward in the various rooms and the heat contained therein will be dissipated to a large degree as such air reaches the floor of such rooms. For convenience I provide the doors 39 for the various rooms of a length sufficient to permit an open space between the floor and the bottom of the doors 39, as indicated by the reference numeral 40, and the cool air passing under such doors will find its way back to either the grille 35 in the door 34 of the chamber 15, or through the various grilles 19 and 21 in the ornamental front for the heating unit as indicated in Figs. 3 and 4.

Such air entering the enclosure 16 through grills 19 and 21, passes through the enclosure in intimate contact with the heat transferring surfaces of the heating unit, and flows in excessively hot status into chamber 15 through the opening 32.

The chamber 15 has advantageously a greater special extent than has the enclosure 16, for effecting expansion of the excessively hot air to accomplish a drop in air temperature. This may be coupled with introduction of relatively cold air to chamber 15 through grill 35, for mixture with the heated air, to effect tempering of the excessively hot air for distribution to the various rooms.

Admission of the additional air to chamber 15 as above explained provides also adequate volume of air at a suitable temperature for distribution through the various ducts 36.

The fire within the fire box 24 is stoked in the usual manner by opening the doors 22. The waste material is removed from the ash pit 26 in the usual manner.

If it is desired to utilize the heating apparatus as an open fireplace, doors 22 are opened to their full extent and the fire built up within the fire box 24 in the usual manner for open fireplaces. Desirably wood or coal is the fuel used, but the heating unit may be piped for the burning of gas or oil, and such fuel may be controlled by the usual automatic stoking means in use at the present time.

When the heating unit is used as an open fireplace, the device still functions as a means for heating and circulating the air within the house, as the opening of the doors 22 does not materially reduce the efficiency of the heating unit for this purpose.

Whereas this invention has been described with reference to specific forms thereof, it is to be clearly understood that changes and modifications may be made without departing from the spirit of this invention, as defined in the following claims.

I claim:

1. In a heating system for a building, the combination with a heater, a casing for said heater, said casing being arranged to bring air into heat exchange relation with said heater and having means for discharging heated air from said casing, of an enclosed, vertically arranged, heated air mixing and distribution chamber of substantially room height, ducts communicating with said distribution chamber substantially at the high point thereof for conducting air from said chamber to a point of discharge into rooms of said building adjacent the ceilings thereof, cool air inlet means for said chamber at a low point thereof, said air inlet means being common to a plurality of rooms of the building and remote from said heater casing, and air passage means between said heater casing and said distribution chamber, said passage means communicating with said chamber intermediate the said chamber cool air inlet means and said ducts and substantially below the level of said ducts, whereby cool air may be inducted into said chamber by the entry of heated air from said casing to said chamber and commingled with said heated air prior to passage through said ducts for ultimate discharge into said rooms.

2. In a heating system for a building comprising a plurality of rooms at substantially a single floor level, the combination with an encased air heating means on a floor common to said rooms, said casing having means for admitting air into heat exchange relation with said heater at a plurality of levels and means for discharging heated air therefrom, of an enclosed heated air mixing and distribution chamber located substantially centrally of said building and extending substantially from floor line to ceiling line thereof, a plurality of ducts communicating with said chamber near a high point thereof and extending laterally therefrom to discharge into said rooms near the ceiling thereof, means for recirculating air from said rooms to said chamber, said means including air inlet means to said chamber at a low point thereof and air passage means affording flow of air from said rooms above the floor thereof into and through said chamber air inlet means, and an upwardly sloping passage affording communication between said heater air discharge means and said chamber and arranged to discharge the greater portion of heated air from said heater into said chamber, the point of entry of said passage to said chamber being above said chamber air inlet means but substantially below the level of said ducts.

ROBERT L. DAVISON.

CERTIFICATE OF CORRECTION.

Patent No. 2,209,324.                                        July 30, 1940.

ROBERT L. DAVISON.

It is hereby certified that error appears in the printed specification of the above numbered patent requiring correction as follows: Page 2, second column, line 2, for the word "special" read --spacial--; and that the said Letters Patent should be read with this correction therein that the same may conform to the record of the case in the Patent Office.

Signed and sealed this 27th day of August, A. D. 1940.

(Seal)                                                 Henry Van Arsdale,
                                                        Acting Commissioner of Patents.